(12) United States Patent
Jackson et al.

(10) Patent No.: US 12,041,203 B2
(45) Date of Patent: *Jul. 16, 2024

(54) TRANSACTION FRAUD PREVENTION TOOL

(71) Applicant: Wells Fargo Bank, N.A., San Francisco, CA (US)

(72) Inventors: John Talbert Jackson, Mooresville, NC (US); Gene C. Baker, Jr., Eldersburg, MD (US); Jon T. Graff, Charlotte, NC (US); Chad Otto Breunig, Huntersville, NC (US); Kevin W. Bell, Roseville, MN (US); Darrell Lee Suen, San Ramon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/304,145

(22) Filed: Apr. 20, 2023

(65) Prior Publication Data

US 2023/0254408 A1 Aug. 10, 2023

Related U.S. Application Data

(63) Continuation of application No. 17/247,819, filed on Dec. 23, 2020, now Pat. No. 11,659,087, which is a
(Continued)

(51) Int. Cl.
*H04M 3/51* (2006.01)
*G06Q 20/40* (2012.01)
*H04W 4/14* (2009.01)

(52) U.S. Cl.
CPC ...... *H04M 3/5183* (2013.01); *G06Q 20/4016* (2013.01); *H04M 2203/6027* (2013.01); *H04W 4/14* (2013.01)

(58) Field of Classification Search
None
See application file for complete search history.

(56) References Cited

U.S. PATENT DOCUMENTS 6,438,599 B1   8/2002  Chack
7,283,827 B2  10/2007  Meadows et al.
(Continued)

FOREIGN PATENT DOCUMENTS

CN      102111275 B    12/2014

OTHER PUBLICATIONS

"U.S. Appl. No. 16/255,003, Advisory Action dated Jul. 14, 2020", 3 pgs.
(Continued)

*Primary Examiner* — Antim G Shah
(74) *Attorney, Agent, or Firm* — SCHWEGMAN LUNDBERG & WOESSNER, P.A.

(57) ABSTRACT

Various examples are directed to systems and methods for detecting potentially fraudulent voice calls to a financial services institution. A computing system may receive an indication of a voice call placed by a voice caller to an operator. The computing system may generate a network address indicator describing a network location. The network address indicator may be provided to the voice caller. The computing system may receive an indication of a financial services account indicated by the voice caller. The computing system may also receive an indication of an access to the network location by a remote device. The computing system may determine, using the indication of the access to the network location, a first location associated with the remote device and determine that the first location does not match a second location associated with the finan-
(Continued)

cial services account. The computing system may generate an alert indicating that the voice call is potentially fraudulent.

20 Claims, 8 Drawing Sheets

Related U.S. Application Data continuation of application No. 16/255,003, filed on Jan. 23, 2019, now Pat. No. 10,880,436.

(56) References Cited

U.S. PATENT DOCUMENTS

| | | | |
|---|---|---|---|
| 7,734,722 | B2 | 6/2010 | Seidl et al. |
| 7,908,645 | B2 | 3/2011 | Varghese et al. |
| 8,009,013 | B1 | 8/2011 | Hirschfeld et al. |
| 8,472,987 | B2 | 6/2013 | Bhatnagar |
| 8,522,010 | B2 | 8/2013 | Ozzie et al. |
| 8,744,410 | B2 | 6/2014 | Krefft |
| 8,862,097 | B2 | 10/2014 | Brand et al. |
| 9,064,259 | B2 | 6/2015 | Aleksin et al. |
| 9,392,456 | B2 | 7/2016 | Disraeli et al. |
| 9,602,662 | B2 | 3/2017 | Dow et al. |
| 9,819,796 | B1 | 11/2017 | Geller et al. |
| 9,888,380 | B2 | 2/2018 | Gupta et al. |
| 10,880,436 | B2 * | 12/2020 | Jackson ............... H04M 3/5183 |
| 11,659,087 | B1 * | 5/2023 | Jackson ............... H04W 4/023 |
| | | | 379/265.09 |
| 2007/0107050 | A1 | 5/2007 | Selvarajan |
| 2011/0138483 | A1 * | 6/2011 | Bravo ............... G06F 21/43 |
| | | | 455/411 |
| 2011/0211682 | A1 | 9/2011 | Singh et al. |
| 2012/0047072 | A1 | 2/2012 | Larkin |
| 2013/0275301 | A1 | 10/2013 | Lehman et al. |
| 2015/0186973 | A1 | 7/2015 | Athimoolam |
| 2015/0319613 | A1 | 11/2015 | Shmilov et al. |
| 2017/0149805 | A1 * | 5/2017 | Kurian ............... H04M 3/38 |
| 2018/0160306 | A1 * | 6/2018 | Gupta ............... G06Q 20/3223 |
| 2020/0236217 | A1 | 7/2020 | Jackson et al. |

OTHER PUBLICATIONS

"U.S. Appl. No. 16/255,003, Final Office Action dated May 8, 2020", 7 pgs.

"U.S. Appl. No. 16/255,003, Non Final Office Action dated Nov. 18, 2019", 8 pgs.

"U.S. Appl. No. 16/255,003, Notice of Allowance dated Aug. 21, 2020", 9 pgs.

"U.S. Appl. No. 16/255,003, Response filed Feb. 18, 2020 to Non Final Office Action dated Nov. 18, 2019".

"U.S. Appl. No. 16/255,003, Response filed Jul. 7, 2020 to Final Office Action dated May 8, 2020", 11 pgs.

"U.S. Appl. No. 17/247,819, Non Final Office Action dated Sep. 15, 2022".

"U.S. Appl. No. 17/247,819, Notice of Allowance dated Jan. 11, 2023".

"U.S. Appl. No. 17/247,819, Response filed Dec. 13, 2022 to Non Final Office Action dated Sep. 15, 2022", 9 pgs.

* cited by examiner

TRANSACTION FRAUD PREVENTION TOOL

CROSS-REFERENCE TO RELATED APPLICATION

This application is a continuation of U.S. patent application Ser. No. 17/247,819, filed Dec. 23, 2020, which is a continuation of U.S. patent application Ser. No. 16/255,003, filed Jan. 23, 2019, now issued as U.S. Pat. No. 10,880,436, which is incorporated by reference herein in its entirety.

TECHNICAL FIELD

Embodiments described herein generally relate to computerized systems and methods for fraud prevention.

BACKGROUND

Customers of financial institutions are sometimes victims of attempted fraud-by-impersonation. In schemes of this type, a fraudster places a voice call to the financial institution while posing as a customer. On the voice call, the fraudster requests a withdrawal or distribution from a customer account. The proceeds of the withdrawal or distribution are then converted.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DETAILED DESCRIPTION

Figure 1:
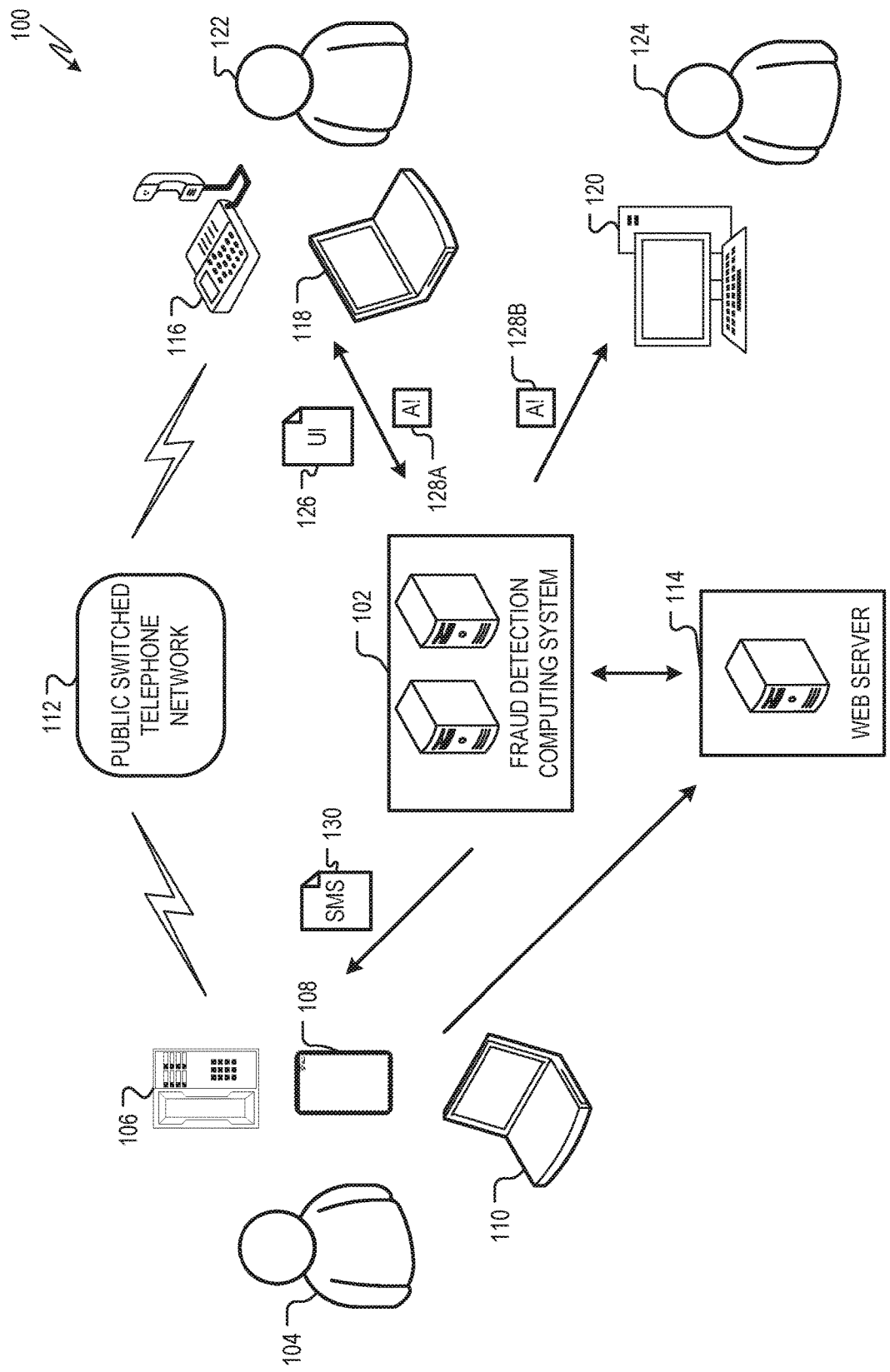
FIG. 1 is a diagram showing one example of an environment for detecting potentially fraudulent calls to a financial services institution.

Various examples are directed to systems and methods for detecting and preventing fraud to customers of a financial institution.

Some fraud-by-impersonation schemes utilize voice calls, for example, via a public switched telephone network (PSTN). The fraudster places a voice call to a financial institution operator and requests a withdrawal, distribution, transfer, or other transaction from the account of a customer of the financial institution. Schemes like this can be difficult to detect and prevent, especially if the fraudster has illicit access to the customer's personal information such as the customer's name, address, Social Security number, etc.

In some cases, the fraudster takes advantage of customer/institution relationships in which the financial institution has limited contact with the customers. This can occur, for example, with customers who hold retirement accounts, such as Individual Retirement Accounts (IRAs), 401(k) accounts, etc. Customers do not typically manage retirement accounts as regularly as other accounts. Therefore, a customer may not contact the financial institution holding his or her retirement accounts as frequently as the customer contacts, for example, the financial institution holding the customer's checking or credit card accounts. Also, many retirement accounts are set-up by a customer's employer. In these cases, contact information for the customer is often provided to the financial institution indirectly by the customer's employer. This can make it challenging for the financial services institution to obtain and maintain correct, current contact information for customers.

Fraud-by-impersonation attempts using voice calls can be uniquely challenging to detect when directed to customer/institution relationships such characterized by limited contact between the financial institution and customer. For example, if the financial institution does not have up-to-date contact information for a customer, it can be difficult to use traditional two-factor authentication techniques to authenticate a voice caller. A fraudster can exploit this, for example, to request a withdrawal and/or to add the fraudster's own contact information to an account thus allowing the fraudster to illicitly meet subsequent two-factor authentication for the account.

Various examples address these and other challenges with systems and methods for detecting potentially fraudulent voice calls, as described herein. When a voice caller places a voice call requesting a withdrawal, distribution, transfer, or other action related to a customer account, a fraud detection computing system is configured to authenticate the voice caller. The fraud detection computing system accesses a network address describing a network location. The network location, in some examples, is a web page hosted by a web server and accessible via the Internet or other suitable network. The network address is communicated to the voice caller and the voice caller is invited to access the network location using a caller computing device. In some examples, the network location and/or network address is specific to a particular voice call such that there is a high likelihood that the voice caller will be the only one to access the network location. Also, in some examples, the voice caller is provided with a unique identifier and invited to input the unique identifier at the network location, thus associating the voice caller with a particular access of the network location.

When the voice caller accesses the network location, the web server determines a geographic location associated with the access. For example, when accessing the network location, the caller computing device reveals its own device network address, such as an Internet Protocol (IP) address. The web server detects the device network address of the caller computing device. Because device network addresses, such as IP addresses, are assigned geographically, the web server and/or fraud detection computing system may be able to associate the access with a particular geographic location.

The location of the access is determined by and/or returned to the fraud detection computing system. The fraud detection computing system can compare the location of the access to one or more locations associated with the relevant account. Consider an example in which a financial services institution holds an account associated with a customer address in upstate New York. If a voice caller requests an account action, but then accesses the network location from a device network address in Nigeria, there may be a high likelihood that the voice call is fraudulent. If there is a mismatch between the location or locations associated with the account and the location of the access, the fraud detection computing system can take a remedial action. The remedial action can include, for example, sending an alert to the financial services operator handling the voice call, sending an alert to a specialized financial services operator, locking the account, etc.

FIG. 1 is a diagram showing one example of an environment 100 for detecting potentially fraudulent calls to a financial services institution. The environment 100 includes a voice caller 104 who places a voice call to a financial services operator 122. The environment 100 also includes a fraud detection computing system 102 and a web server 114.

The voice caller 104 places the voice call to the financial services operator 122 via the Public Switched Telephone Network (PSTN) 112 using a telephone device, such as one of the telephone devices 106, 108. The voice call is received by the financial services operator 122 at a telephone device 116.

The telephone devices 106, 108, 116 may be or include any suitable device configured to place voice calls using the PSTN 112. Telephone devices 106, 108, 116 can be wired or wireless. For example, the telephone devices 106, 108, 116 may communicate with the PSTN 112 directly and/or via another wired or wireless network. In some examples, one or more of the telephone devices 106, 108, 116 is configured access the PSTN 112 using a voice over IP (VOIP) or similar arrangement. Also, in some examples, one or more of the telephone devices 106, 108, 116 accesses the PSTN 112 via a cellular or other mobile telephone network.

Some telephone devices 106, 108, 116 can also operate as a caller computing device with which the voice caller 104 can access a network location as described herein. For example, the telephone device 108 is a smart device arranged to access network locations, as described herein. For example, the telephone device 108 may be arranged in a manner similar to that of the computing devices described herein at FIGS. 6-8.

The voice caller 104 can ask the financial services operator 122 to take an action related to an account held by the financial services institution. The requested action can be any action associated with an account including, for example, a withdrawal from the account, a distribution from the account, and/or a deposit to the account. In some examples, the requested action can also be or include a change to customer information associated with the account such as, for example, a change or addition to the customer's address, a change or addition to the customer's phone number etc.

The fraud detection computing system 102 receives an indication that the voice call was received. In some examples, the indication is generated automatically by the telephone device 116 used by the financial services operator 122. For example, the telephone device 116 can be a network-enabled telephone that communicates with the fraud detection computing system 102 via a network, as described in more detail in FIG. 2. For example, the telephone device 116 may be arranged in a manner similar to that of the computing devices described herein at FIGS. 6-8. Also, in some examples, the financial services operator 122 utilizes a computing device 118. The computing device 118 can be any suitable type of device such as, for example, a laptop computer, a desktop computer, a tablet computing device, a mobile phone, etc. The computing device 118 can display an operator user interface (UI) 126 provided by the fraud detection computing system 102. The operator UI 126 can allow the financial services operator 122 to communicate information to and from the fraud detection computing system 102. For example, the financial services operator 122 can utilize the operator UI 126 to indicate to the fraud detection computing system 102 that the voice call is received. In some examples, the financial services operator 122 also uses the operator UI 126 to indicate to the fraud detection computing system 102 an action requested by the voice caller 104.

Upon receiving an indication of the voice call, the fraud detection computing system 102 accesses a network address indicator that describes a network location. This can include generating the network address and/or requesting the network address from the web server 114. In some examples, the fraud detection computing system 102 provides the web server 114 with a web documents, such as a Hypertext Markup Language (HTML) page that is to be served when the network location is accessed.

The network location, in some examples, is hosted by the web server 114. The web server 114 can be or include any suitable computing device or devices such as, for example, one or more servers. In some examples, the network location is uniquely associated with the voice call. For example, the fraud detection computing system 102 may instruct the web server 114 to generate the network location and provide a network address associated with the network location. Although the fraud detection computing system 102 and web server 114 are illustrated as separate components, in some examples, some or all of the functionality of the fraud detection computing system 102 and web server 114 can be assigned to a common computing system and/or divided in different ways.

The fraud detection computing system 102 provides an indication of the network address to the voice caller 104. In some examples, the fraud detection computing system 102 provides the indication of the network address directly to the voice caller 104. For example, when the voice caller 104 makes the voice call using a telephone device capable of receiving short message service (SMS) or other text messages, the fraud detection computing system 102 can send an SMS message 130 including the indication of the network address to the mobile telephone device 108. The fraud detection computing system 102 can determine to send the SMS message 130 in any suitable way. For example, the fraud detection computing system 102, or other system, may compare a phone number associated with the voice call to a list of phone numbers associated with devices capable of receiving the SMS message 130. Also, in some examples, the financial services operator 122 verbally asks the voice caller 104 if their device is capable of receiving SMS messages and indicates an answer to the fraud detection computing system 102 via the operator UI 126.

In some examples, the fraud detection computing system 102 provides the indication of the network address to the voice caller 104 indirectly, via the financial services operator 122. For example, the fraud detection computing system 102 can provide the network address or an indication thereof to the financial services operator 122 via the operator UI 126.

The financial services operator 122 can, in turn, provide the network address to the voice caller 104, for example, by speaking the network address over the voice call.

The voice caller 104 is prompted to access the network location using the network address. In examples in which the network address is provided to the voice caller in an SMS message 130, the SMS message may include a hyperlink or other selectable link. When the voice caller 104 selects the link using the mobile telephone device 108, it may cause the mobile telephone device 108 to access the network location. In examples in which the network address is provided to the voice caller 104 via the voice call, the voice caller can enter the network address, for example, into a web browser executing at the mobile telephone device 108 or any other suitable user computing device 110 such as, for example, a laptop computer, a desktop computer, a tablet computing device, a mobile phone, etc. The user computing device 110 may then access the network location.

When the voice caller 104 accesses the network location, the web server 114, which hosts the network location, receives an indication of the device network address associated with the caller computing device from which the voice caller 104 accessed the network location, such as the mobile telephone device 108 or computing device 110. From the device network address, the web server 114 and/or fraud detection computing system 102 can determine a geographic location of the access. For example, network addresses, such as IP addresses, may be assigned geographically.

The fraud detection computing system 102 compares the geographic location of the access to one or more geographic locations associated with the account that is the subject of the voice call. For example, the fraud detection computing system 102 may compare the geographic location of the access to one or more customer addresses associated with the account. If the geographic location of the access matches one or more of the customer addresses associated with the account, then the voice call is more likely to be legitimate, and not fraudulent. The geographic locations may match, for example, if the geographic location indicated by the device network address is within a threshold distance of at least one geographic location associated with the account. In some examples, the fraud detection computing system indicates a match to the financial services operator 122 of a detected match via the operator UI 126. The financial services operator 122 may continue to assist the voice caller 104 to execute their desired transaction or other action.

On the other hand, if the geographic location of the access fails to match one or more of the customer addresses associated with the account, it indicates that the voice call is potentially fraudulent. The fraud detection computing system 102 can respond by taking a remedial action. Various different types of remedial actions can be taken. One example remedial action involves sending an alert message 128A to the financial services user 122, for example, via the operator UI 126. The alert message 128A, in some examples, is configured to interrupt other processes executing at the computing device 118 to alert the financial services operator 122 that the voice call is potentially fraudulent. The financial services operator 122 can respond, for example, by ending the voice call, restricting the actions taken in response to the voice call, and/or escalating the voice call to a specialized financial services operator 124.

In some examples, the remedial action includes sending an alert message 128B to a user computing device 120 associated with the specialized financial services operator 124. The specialized financial services operator 124 may be trained to handle potentially fraudulent transactions. Like the alert message 128A, the alert message 128B, in some examples, is configured to interrupt other processing at the user computing device 120 to alert the specialized financial services operator 124 of the potential fraud.

In another example, the remedial action can include fully or partially locking the account referenced by the voice caller 104. Partially locking the account can include prohibiting certain transactions on the account, such as withdrawals or distributions. Partially locking the account can also include, for example, requiring additional human authorization before processing a transaction and/or other change to the account. Fulling locking the account may include prohibiting all transactions on the account. In some examples, fulling locking the account also includes preventing all changes to the account such as, for example, changes to customer data.

Figure 2:
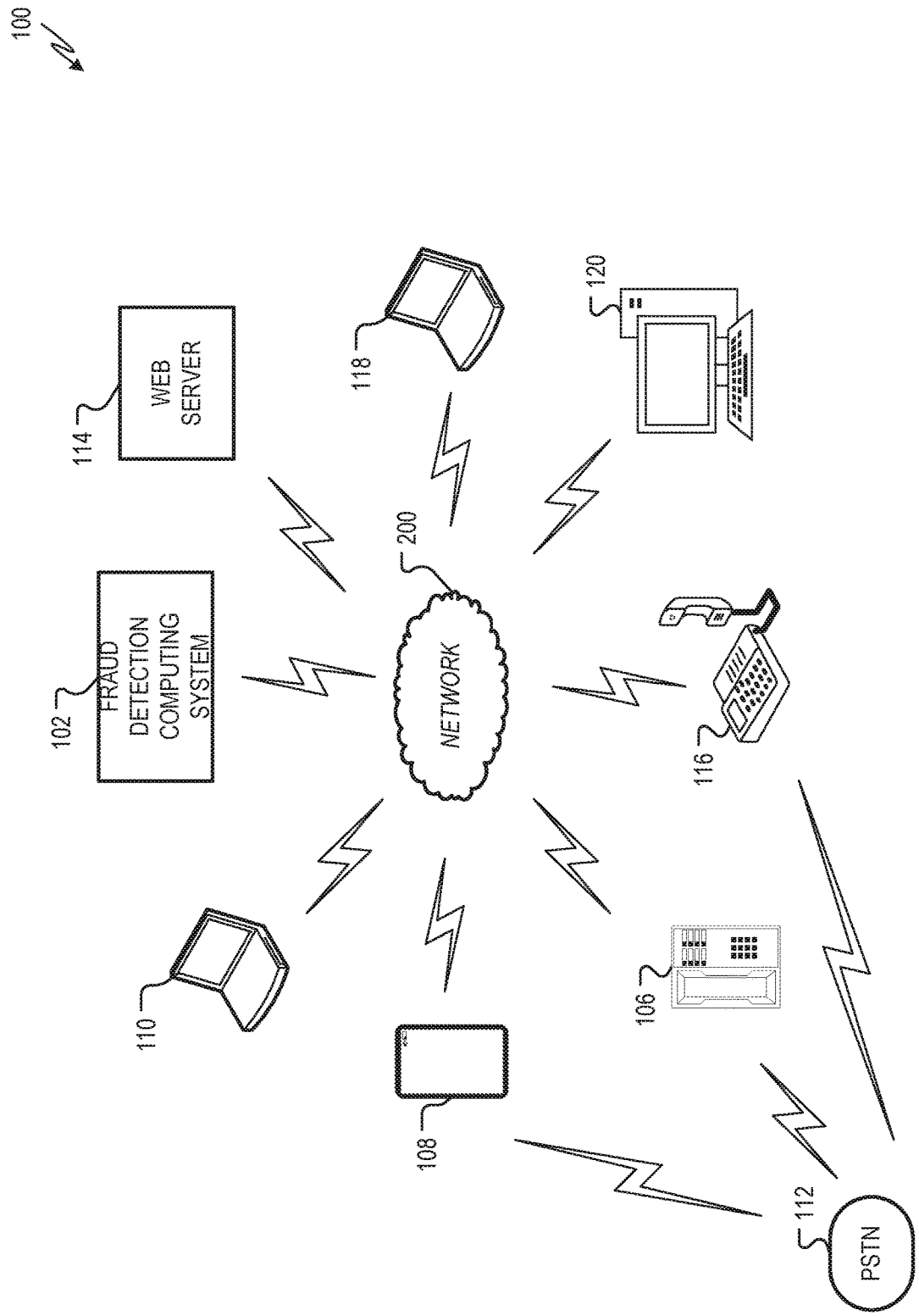
FIG. 2 is a diagram showing another example of the environment of FIG. 1 including additional details.

FIG. 2 is a diagram showing another example of the environment 100 including additional details. In the example of FIG. 2, the user computing devices 110, 118, telephone devices 106, 108, 116, web server 114, and fraud detection computing system 102 are in communication with one another via a network 200. The network 200 may be or comprise any suitable network element operated according to any suitable network protocol. For example, one or more portions of the network 200 may be an ad hoc network, an intranet, an extranet, a virtual private network (VPN), a local-area network (LAN), a wireless LAN (WLAN), a wide-area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

FIG. 2 also shows that the telephone devices 106, 108, 116 can be in communication with one other via a the PSTN 112, which as described herein may be or include any suitable wired, wireless, and/or mixed telephone network. The PSTN 112 can include various switches, exchanges, and/or other equipment for routing voice calls.

Figure 3:
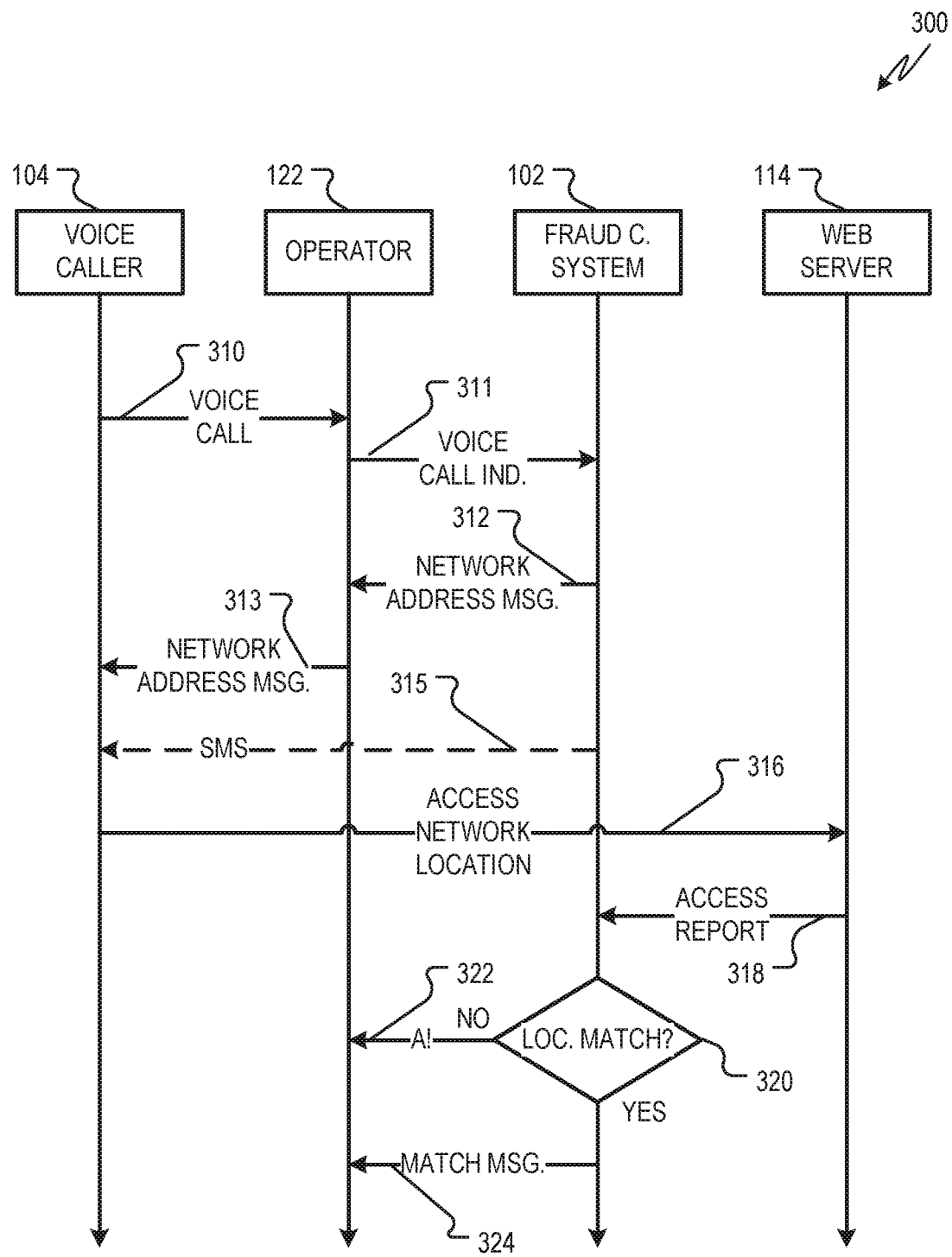
FIG. 3 is a diagram showing one example of a workflow that can be executed in the environment of FIG. 1 to detect a potentially fraudulent voice call to a financial services institution.

FIG. 3 is a diagram showing one example of a workflow 300 that can be executed in the environment 100 of FIG. 1 to detect a potentially fraudulent voice call to a financial services institution. The workflow 300 includes the voice caller 104, the financial services operator 122, the fraud detection computing system 102, and the web server 114. The voice caller 104 places the voice call 310 to the financial services operator 122. The voice call 310 can be placed, for example, from a telephone device 106, 108 to a telephone device 116 associated with the financial services operator 122.

The financial services operator 122 provides an indication 311 of the voice call 310 to the fraud detection computing system 102. For example, the financial services operator 122 can provide information about the voice call 310 to the fraud detection computing system 102 via the operator UI 126. Also, in some examples, the telephone device 116 of the financial services operator 122 is configured to report the voice call 310 to the fraud detection computing system 102 upon receipt.

Responsive to the indication 311, the fraud detection computing system 102 generates a network address corresponding to a network location hosted by the web server 114. Optionally, the fraud detection computing system 102 generates the network address and prompts the web server 114 to begin hosting the associated network location. Also, in some examples, the fraud detection computing system 102 queries the web server 114 for an available network location and associated network address. In the example of FIG. 3, the fraud detection computing system provides a network address message 312 indicating the network address to the financial services operator 122, for example, via the operator UI 126. The financial services operator 122, in turn, provides a network address message 313 to the voice caller 104, for example, via the voice call 310. In some examples, the fraud detection computing system 102 sends the network address directly to the voice caller 104, for example, via the SMS message 315 described herein, indicated by the dashed line in FIG. 3.

Upon receiving the network address, the voice caller 104 uses the network address to access 316 the network location. For example, the voice caller 104 can enter the network address into a computing device, such as the mobile phone device 108 and/or the user computing device 110. For example, the computing device can execute web browser or similar software. The voice caller 104 can enter the network address into the web browser to initiate the access 316. In examples in which the network address is provided via the SMS message 315, the SMS message 315 can include a selectable link. The voice caller 104 can select the link to initiate the access 316.

The web server 114 can report the access with an access report 318. The access report 318 can include, for example, an indication of a geographic location of the access 316, and/or a device network address associated with the access 316 from which the fraud detection computing system 102 can determine the geographic location of the access.

At operation 320, the fraud detection computing system 102 compares the geographic location of the access 316 to one or more addresses associated with a customer account of the voice call 310. If the locations do not match, then the fraud detection computing system 102 can take a remedial action, as described herein. In the example of FIG. 3, the remedial action includes sending an alert message 322 to the operator 122. The alert message 322 may be similar to the alert messages 128A, 128B of FIG. 1. If there is a location match at operation 320, the fraud detection computing system 102 optionally sends to the financial services operator 122 a match message 324 indicating that an address match has been detected. This may indicate to the financial services operator 122 that transactions and/or other changes requested by the voice caller 104 may be processed.

In the example of FIG. 3, the fraud detection computing system 102 associates the access 316 with the voice call 310, for example, by using a unique network address and associated network location. Accordingly, the voice caller 104 may be the only one expected to access the network location. Because of this, it may not be necessary for the fraud detection computing system 102 to query whether the access 316 was by the voice caller 104. In some examples, instead of using a unique network address and/or network location, the voice caller 104 can be provided with unique identifier data.

Figure 4:
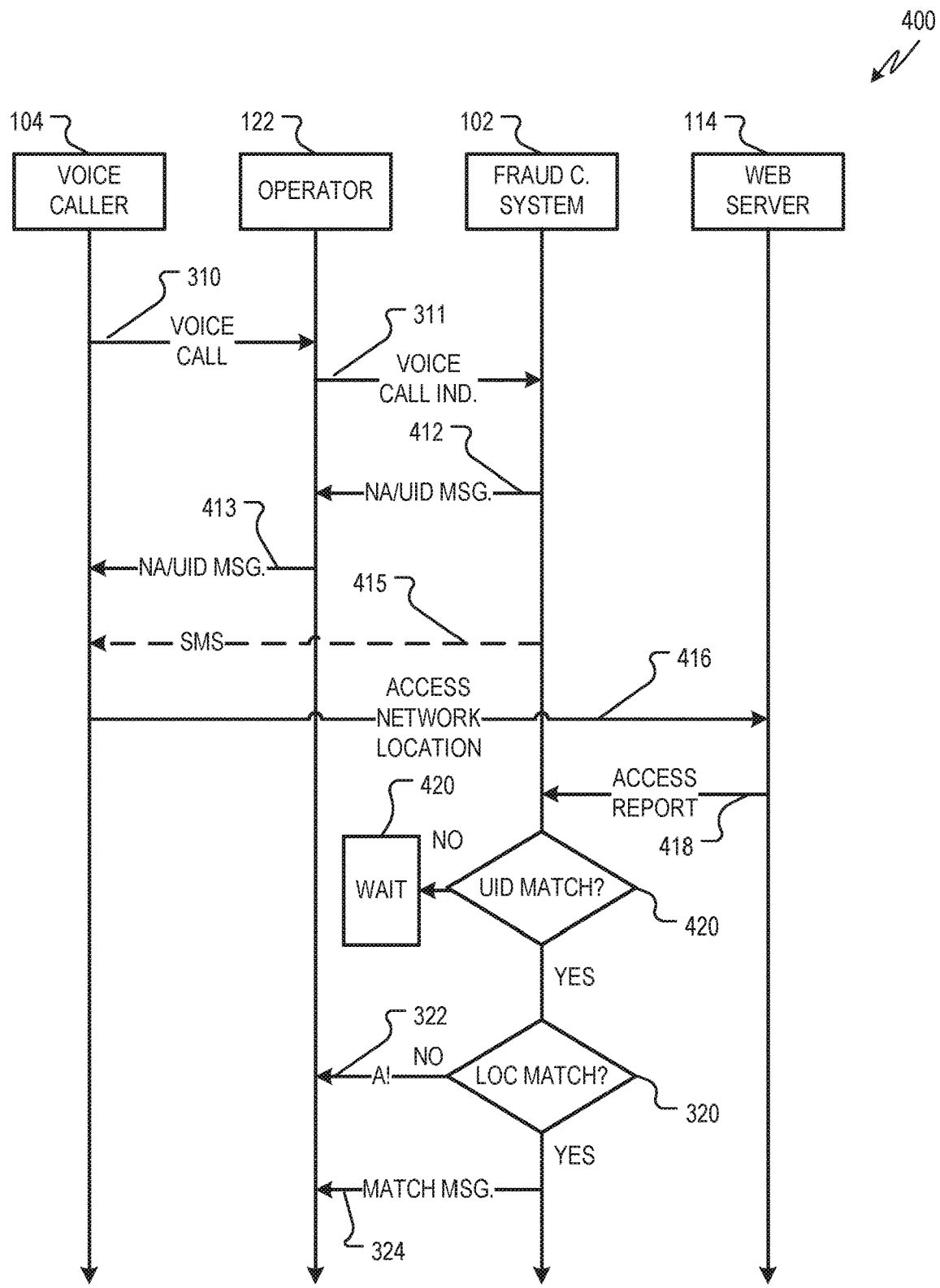
FIG. 4 is a diagram showing another example of a workflow that can be executed in the environment of FIG. 1 to detect a potentially fraudulent voice call to a financial services institution.

FIG. 4 is a diagram showing another example of a workflow 400 that can be executed in the environment 100 of FIG. 1 to detect a potentially fraudulent voice call to a financial services institution. In the example workflow 400, the fraud detection computing system 102 generates unique identifier data that is provided to the voice caller 104. The unique identifier data can include, for example, an alphanumeric code, a user name, a personal identification number (PIN), etc. In the workflow 400, the fraud detection computing system 102 provides the network address and the unique identifier to the financial services operator 122 at a message 412. The financial services operator 122, in turn, provides the network address and the unique identifier to the voice caller 104 with message 413 that may be, for example, be delivered verbally via the voice call 310.

In the workflow 400, the voice caller 104 is prompted to provide the unique identifier during an access 416 to the network location. The web server 114 may provide the unique identifier back to the fraud detection computing system 102 with access report 418. At operation 420, the fraud detection computing system 102 may determine if the access 416 included the voice caller 104 providing the unique identifier. If the unique identifier is not provided and/or if the wrong unique identifier is provided, it may mean that the access 416 is not associated with the voice caller 104. The fraud detection computing system 102 may respond at 420 by waiting for an access report 418 indicating the correct unique identifier. Optionally, the fraud detection computing system 102 may associate the access report 418 with a different voice call other than voice call 310, for example, if the access report 418 includes a different unique identifier associated with a different voice call, the fraud detection computing system 102 may associate the access report 418 with the different voice call. If the unique identifier does match at operation 420, the fraud detection computing system 102 may proceed to operation 320 and beyond as described with respect to FIG. 3. In some examples, the unique identifier is embedded in the network address provided to the voice caller 104, for example, via the SMS message 415 and/or verbally by the financial services operator 122.

Figure 5:
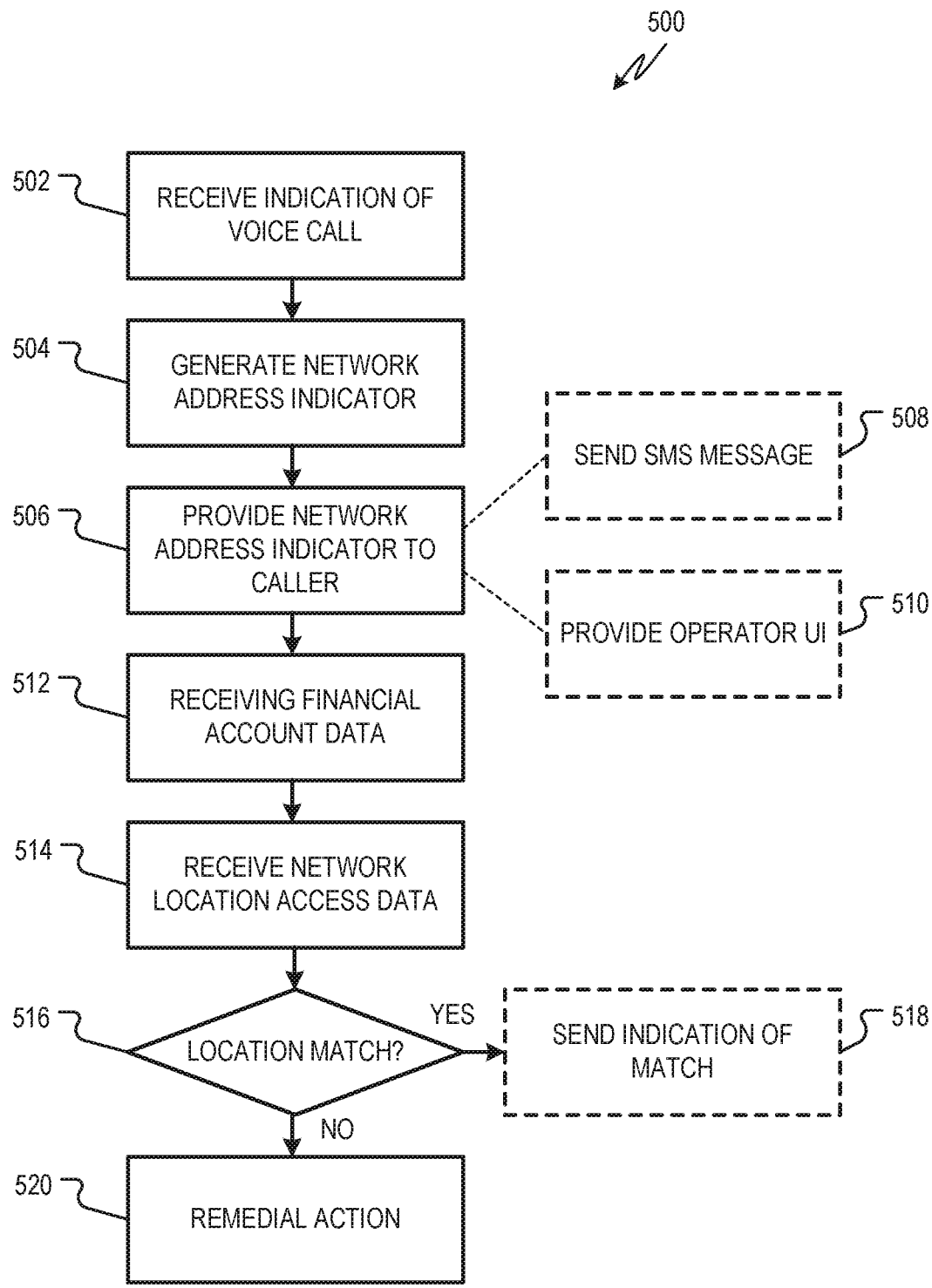
FIG. 5 is a flowchart showing one example of a process flow that can be executed by the fraud detection computing system of FIG. 1 to detect a potentially fraudulent voice call.

FIG. 5 is a flowchart showing one example of a process flow 500 that can be executed by the fraud detection computing system 102 of FIG. 1 to detect a potentially fraudulent voice call. At operation 502, the fraud detection computing system 102 receives an indication of a voice call. The indication can be received, for example, from a telephone device 116 associated with a financial services operator 122 upon receipt of the voice call. In other examples, the indication is received from the financial services operator 122 via a operator UI 126.

At operation 504, the fraud detection computing system 102 accesses and/or generates a network address indicator. For example, the fraud detection computing system 102 can receive a network address from the web server 114 and/or generate a network address and provide the network address to the web server 114. The network address, as described herein, indicates a network location that can be accessed by the voice caller 104 as described herein. The network address indicator can be, for example, a page or other component of the operator UI 126 provided to the financial services operator, a hyperlink to be provided with an SMS message 130, or other suitable format.

At operation 506, the fraud detection computing system 102 provides the network address indicator to the voice caller. This can be performed in various different ways, as described herein. For example, at optional sub-operation 508, the fraud detection computing system 102 provides the network address indicator to directly to the voice caller 104 as a selectable link or other data format included in the SMS message 130. Alternatively (or additionally), the fraud detection computing system 102 can, at optional sub-operation 510, provide the network address indicator to the financial services operator 122 via the operator UI 126. The financial services operator 122 can then provide the network address to the voice caller 104, for example, via the voice call.

At operation 512, the fraud detection computing system 102 receives financial account data describing a financial account that is the subject of the voice call. For example, the financial services user 122 can provide an account number or other identifier of the account to the fraud detection computing system 102 via the operator UI 126. The fraud detection computing system 102 can use the provided account number of other indicator to access data about the financial account including, for example, one or more customer addresses associated with the account.

At operation 514, the fraud detection computing system 102 receives, for example, from the web server 114, access data indicating an access to the network location. The access data can include a geographic location of the device making the access. In some examples, the access data includes a device network access of the device making the access. The fraud detection computing system 102 can use the device network access to derive a geographic location of the device. Optionally, the access information can include a unique identifier provided to the voice caller 104 as described herein and described with respect to FIG. 4.

At operation 516, the fraud detection computing system 102 determines whether the geographic location of the access matches at least one geographic location associated with the financial account. If yes, the fraud detection computing system 102 sends an indication of the match to the financial services operator 122 at optional operation 518. If there is no match, the fraud detection computing system 102 executes a remedial action at operation 520, as described herein.

Figure 6:
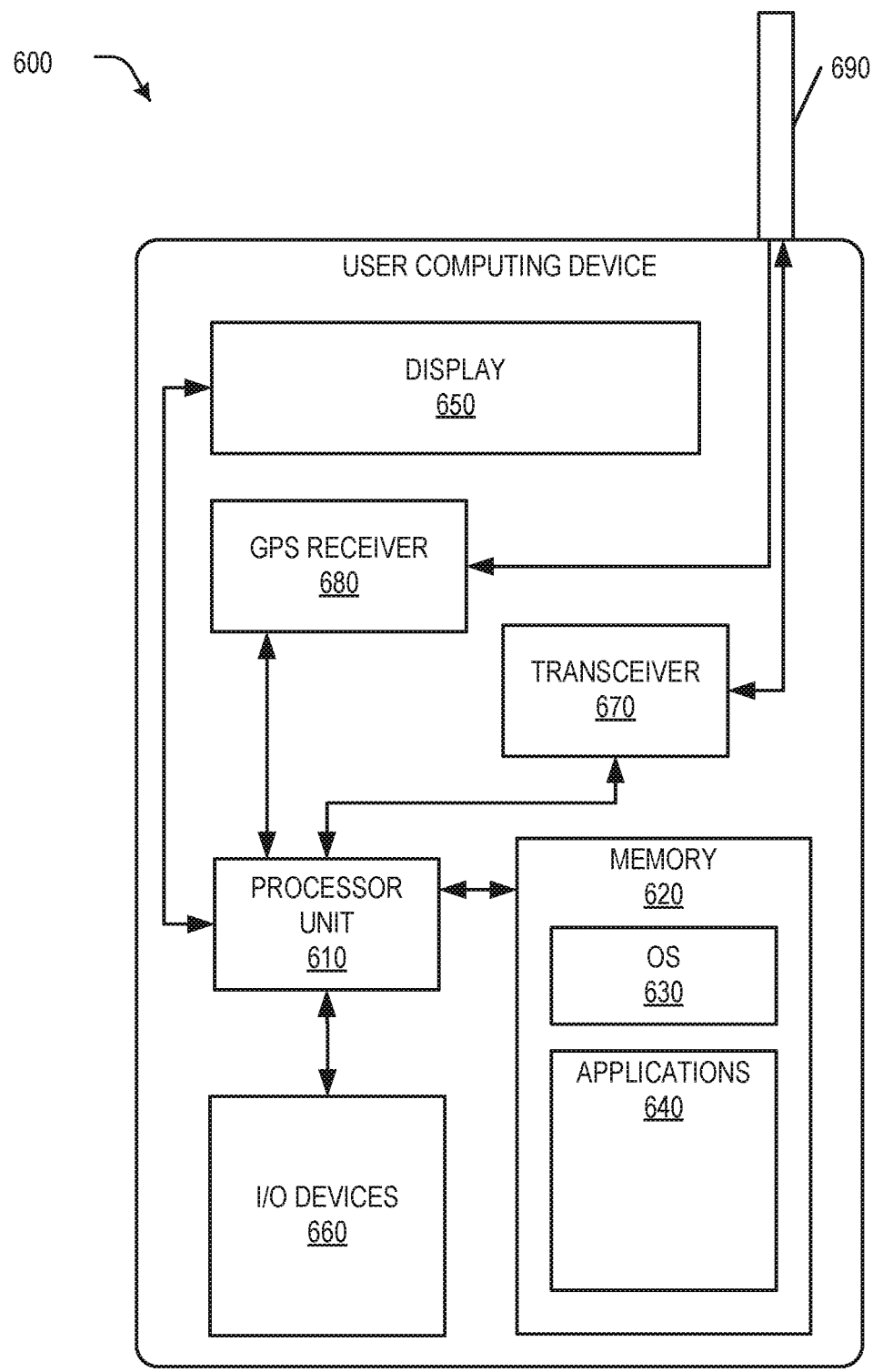
FIG. 6 is a block diagram showing an example architecture of a user computing device.

FIG. 6 is a block diagram showing an example architecture 600 of a user computing device. The architecture 600 may, for example, describe any of the computing devices described herein, including, for example, the telephone devices 106, 108, 116, computing devices 110, 118, 120, all or part of the fraud detection computing system 102, all or part of the web server 114, etc.

The architecture 600 comprises a processor unit 610. The processor unit 610 may include one or more processors. Any of a variety of different types of commercially available processors suitable for computing devices may be used (for example, an XScale architecture microprocessor, a Microprocessor without Interlocked Pipeline Stages (MIPS) architecture processor, or another type of processor). A memory 620, such as a Random Access Memory (RAM), a flash memory, or another type of memory or data storage, is typically accessible to the processor unit 610. The memory 620 may be adapted to store an operating system (OS) 630, as well as application programs 640.

The processor unit 610 may be coupled, either directly or via appropriate intermediary hardware, to a display 650 and to one or more input/output (I/O) devices 660, such as a keypad, a touch panel sensor, a microphone, and the like. Such I/O devices 660 may include a touch sensor for capturing fingerprint data, a camera for capturing one or more images of the user, a retinal scanner, or any other suitable devices. The I/O devices 660 may be used to implement I/O channels, as described herein. In some examples, the I/O devices 660 may also include sensors.

Similarly, in some examples, the processor unit 610 may be coupled to a transceiver 670 that interfaces with an antenna 690. The transceiver 670 may be configured to both transmit and receive cellular network signals, wireless data signals, or other types of signals via the antenna 690, depending on the nature of the computing device implemented by the architecture 600. Although one transceiver 670 is shown, in some examples, the architecture 600 includes additional transceivers. For example, a wireless transceiver may be utilized to communicate according to an IEEE 802.11 specification, such as Wi-Fi and/or a short-range communication medium. Some short-range communication mediums, such as NFC, may utilize a separate, dedicated transceiver. Further, in some configurations, a Global Positioning System (GPS) receiver 680 may also make use of the antenna 690 to receive GPS signals. In addition to or instead of the GPS receiver 680, any suitable location-determining sensor may be included and/or used, including, for example, a Wi-Fi positioning system. In some examples, the architecture 600 (e.g., the processor unit 610) may also support a hardware interrupt. In response to a hardware interrupt, the processor unit 610 may pause its processing and execute an interrupt service routine (ISR).

Figure 7:
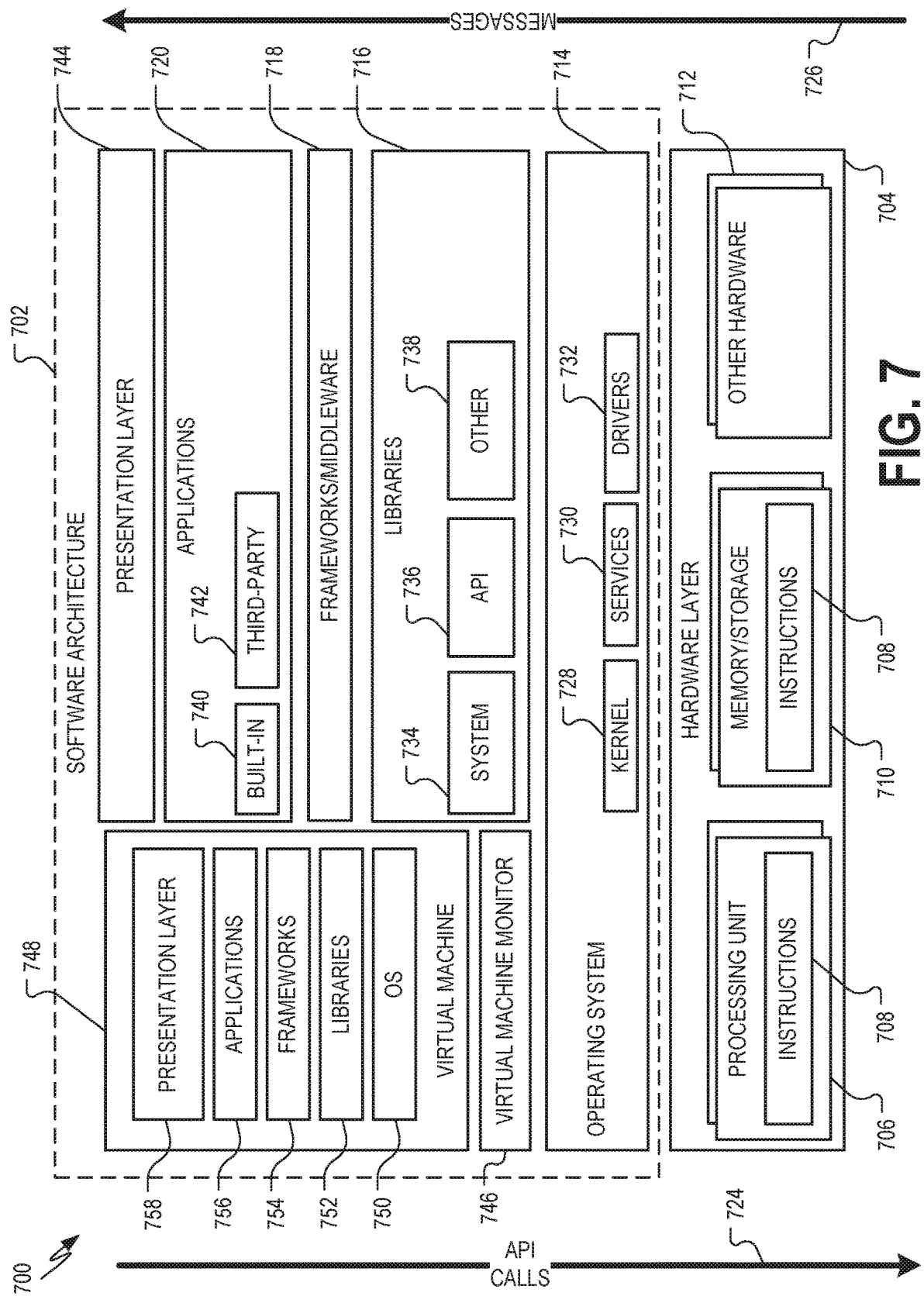
FIG. 7 is a block diagram showing one example of a software architecture for a computing device.

FIG. 7 is a block diagram 700 showing one example of a software architecture 702 for a computing device. The software architecture 702 may be used in conjunction with various hardware architectures, for example, as described herein. FIG. 7 is merely a non-limiting example of a software architecture 702, and many other architectures may be implemented to facilitate the functionality described herein. A representative hardware layer 704 is illustrated and can represent, for example, any of the above-referenced computing devices. In some examples, the hardware layer 704 may be implemented according to an architecture 800 of FIG. 8 and/or the architecture 600 of FIG. 6.

The representative hardware layer 704 comprises one or more processing units 706 having associated executable instructions 708. The executable instructions 708 represent the executable instructions of the software architecture 702, including implementation of the methods, modules, components, and so forth of FIGS. 1-5. The hardware layer 704 also includes memory and/or storage modules 710, which also have the executable instructions 708. The hardware layer 704 may also comprise other hardware 712, which represents any other hardware of the hardware layer 704, such as the other hardware illustrated as part of the architecture 800.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720, and a presentation layer 744. Operationally, the applications 720 and/or other components within the layers may invoke application programming interface (API) calls 724 through the software stack and receive a response, returned values, and so forth illustrated as messages 726 in response to the API calls 724. The layers illustrated are representative in nature and not all software architectures have all layers. For example, some mobile or special-purpose operating systems may not provide a frameworks/middleware 718 layer, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of a hardware or software interrupt and, in response, cause the software architecture 702 to pause its current processing and execute an Interrupt Service Routine (ISR) when an interrupt is received. The ISR may generate an alert.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than by interfacing directly with the underlying operating system 714 functionality (e.g., kernel 728, services 730, and/or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 and/or other software components/modules. For example, the frameworks 718 may provide various graphical user interface (GUI) functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. The third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 742 may invoke the API calls 724 provided by the mobile operating system such as the operating system 714 to facilitate functionality described herein.

The applications 720 may utilize built-in operating system functions (e.g., kernel 728, services 730, and/or drivers 732), libraries (e.g., system libraries 734, API libraries 736, and other libraries 738), or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 7, this is illustrated by a virtual machine 748. A virtual machine creates a software environment where applications/modules can execute as if they were executing on a hardware computing device. The virtual machine 748 is hosted by a host operating system (e.g., the operating system 714) and typically, although not always, has a virtual machine monitor 746, which manages the operation of the virtual machine 748 as well as the interface with the host operating system (e.g., the operating system 714). A software architecture executes within the virtual machine 748, such as an operating system 750, libraries 752, frameworks/middleware 754, applications 756, and/or a presentation layer 758. These layers of software architecture executing within the virtual machine 748 can be the same as corresponding layers previously described or may be different.

Figure 8:
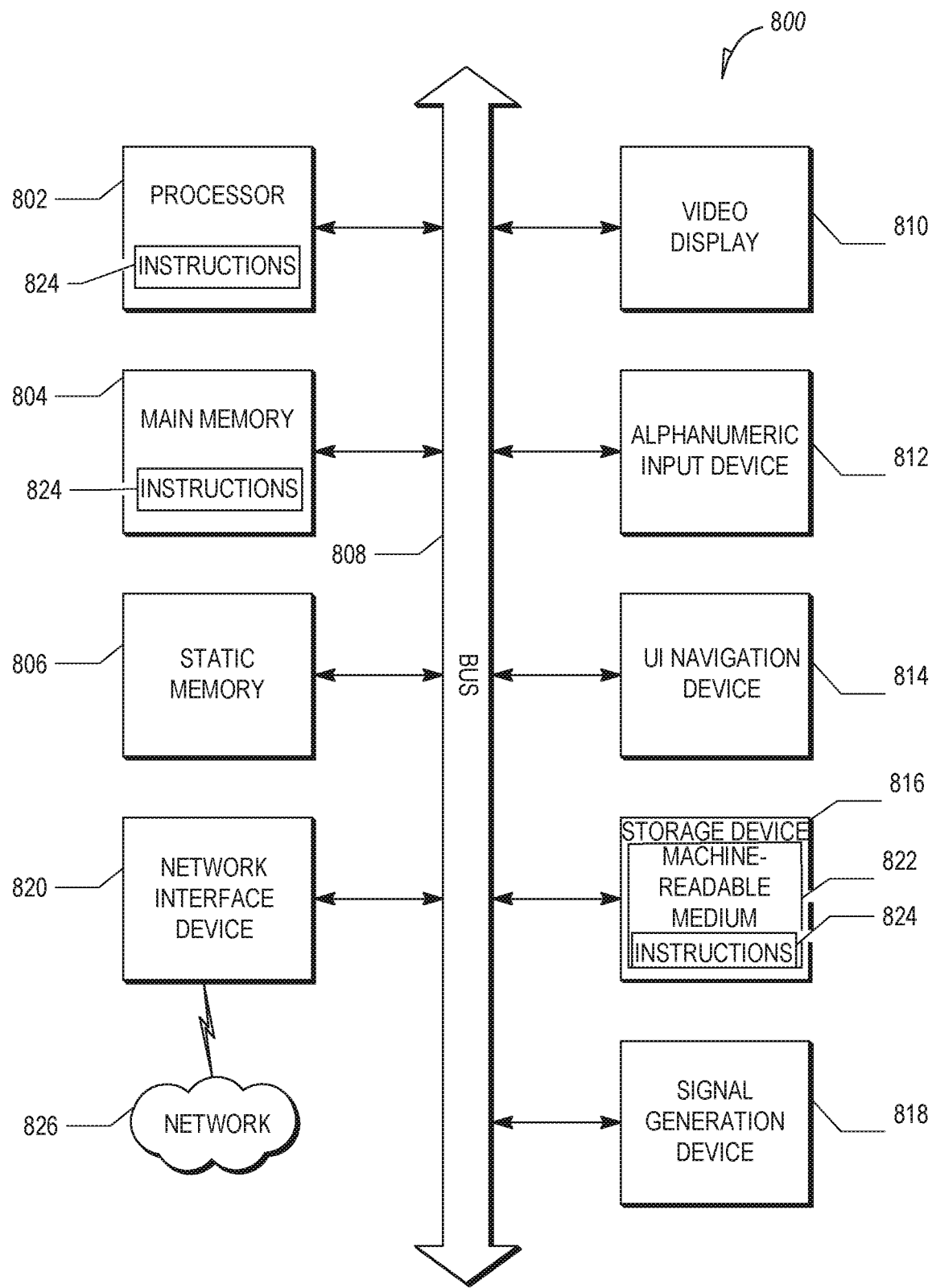
FIG. 8 is a block diagram illustrating a computing device hardware architecture, within which a set or sequence of instructions can be executed to cause a machine to perform examples of any one of the methodologies discussed herein.

FIG. 8 is a block diagram illustrating a computing device hardware architecture 800, within which a set or sequence of instructions can be executed to cause a machine to perform examples of any one of the methodologies discussed herein. The architecture 800 may describe, for example, any of the computing devices and/or control circuits described herein. The architecture 800 may execute the software architecture 702 described with respect to FIG. 7. The architecture 800 may operate as a standalone device or may be connected (e.g., networked) to other machines. In a networked deployment, the architecture 800 may operate in the capacity of either a server or a client machine in server-client network environments, or it may act as a peer machine in peer-to-peer (or distributed) network environments. The architecture 800 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 800 includes a processor unit 802 comprising at least one processor (e.g., a central processing unit (CPU), a graphics processing unit (GPU), or both, processor cores, compute nodes, etc.). The architecture 800 may further comprise a main memory 804 and a static memory 806, which communicate with each other via a link 808 (e.g., a bus). The architecture 800 can further include a video display unit 810, an alphanumeric input device 812 (e.g., a keyboard), and a UI navigation device 814 (e.g., a mouse). In some examples, the video display unit 810, alphanumeric input device 812, and UI navigation device 814 are incorporated into a touchscreen display. The architecture 800 may additionally include a storage device 816 (e.g., a drive unit), a signal generation device 818 (e.g., a speaker), a network interface device 820, and one or more sensors (not shown), such as a GPS sensor, compass, accelerometer, or other sensor.

In some examples, the processor unit 802 or another suitable hardware component may support a hardware interrupt. In response to a hardware interrupt, the processor unit 802 may pause its processing and execute an ISR, for example, as described herein.

The storage device 816 includes a non-transitory machine-readable medium 822 on which is stored one or more sets of data structures and instructions 824 (e.g., software) embodying or utilized by any one or more of the methodologies or functions described herein. The instructions 824 can also reside, completely or at least partially, within the main memory 804, within the static memory 806, and/or within the processor unit 802 during execution thereof by the architecture 800, with the main memory 804, the static memory 806, and the processor unit 802 also constituting machine-readable media. The instructions 824 stored at the machine-readable medium 822 may include, for example, instructions for implementing the software architecture 702, instructions for executing any of the features described herein, etc.

While the machine-readable medium 822 is illustrated in an example to be a single medium, the term "machine-readable medium" can include a single medium or multiple media (e.g., a centralized or distributed database, and/or associated caches and servers) that store the one or more instructions 824. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM) and electrically erasable programmable read-only memory (EEPROM)) and flash memory devices; magnetic disks such as internal hard disks and removable disks; magneto-optical disks; and CD-ROM and DVD-ROM disks.

The instructions 824 can further be transmitted or received over a communications network 826 using a transmission medium via the network interface device 820 utilizing any one of a number of well-known transfer protocols (e.g., hypertext transfer protocol (HTTP)). Examples of communication networks include a LAN, a WAN, the Internet, mobile telephone networks, plain old telephone service (POTS) networks, and wireless data networks (e.g., Wi-Fi, 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A computer-implemented method of detecting potentially fraudulent voice calls to a financial services institution, the method comprising:
   receiving, by a computing system, an indication of a voice call placed by a voice caller to an operator, wherein a network address indicator describing a network location is provided to the voice caller;
   receiving, by the computing system, an indication of a financial services account indicated by the voice caller;
   receiving, by the computing system, an indication of an access to the network location by a remote device;
   determining, by the computing system using the indication of the access to the network location, a geographic location associated with the remote device;
   determining, by the computing system, that the geographic location associated with the remote device matches a second geographic location associated with the financial services account; and
   responsive to the determining that the geographic location associated with the remote device matches a second geographic location associated with the financial services account, sending a match message to the operator, the match message indicating a low risk that the voice call is fraudulent.

2. The computer-implemented method of claim 1, wherein the match message indicates that the geographic location associated with the remote device matches the geographic location associated with the financial services account.

3. The computer-implemented method of claim 1, further comprising:
   receiving, by the computing system, an indication of a second voice call placed by a second voice caller to an operator, wherein a second network address indicator describing a second network location is provided to the second voice caller;
   receiving, by the computing system, an indication of a second financial services account indicated by the voice caller;
   receiving, by the computing system, an indication of an access to the second network location by a second remote device;
   determining, by the computing system using the indication of the access to the second network location, a geographic location associated with the second remote device;

determining; by the computing system, that the geographic location associated with the second remote device does not match a geographic location associated with the second financial services account; and responsive to the determining that the geographic location associated with the second remote device does not match a geographic location associated with the second financial services account, generating an alert indicating that the second voice call is potentially fraudulent.

4. The computer-implemented method of claim 1, further comprising generating, by the computing system, an operator user interface (UI) comprising the network address indicator, wherein the network address indicator is provided to the voice caller by the operator via the voice call.

5. The computer-implemented method of claim 1, further comprising:
   generating, by the computing system, a short message service (SMS) message comprising the network address indicator; and
   sending the SMS message to a phone number associated with a telephone device of e voice caller.

6. The computer-implemented method of claim 5, wherein the SMS message comprises a selectable link to the network location.

7. The computer-implemented method of claim 1, further comprising:
   generating, by the computing system, unique identifier data;
   providing the unique identifier data to the voice caller via the voice call;
   receiving, by the computing system, an indication that the unique identifier data was received from the remote device via the access to the network location; and
   receiving, by the computing system; an indication that the unique identifier data was received from the remote device via the access to the network location, the sending of the mat message also being responsive to receiving the indication that the unique identifier data was received from the remote device via the access to the network location.

8. The computer-implemented method of claim 7, further comprising:
   generating, by the computing system, an operator user interface (UI) comprising the network address indicator; and
   providing, by the computing system, the unique identifier data to the operator via the operator UI, wherein the unique identifier data is provided to the voice caller by the operator via the voice call.

9. The computer-implemented method of claim 7, further comprising:
   generating, by the computing system, a short message service (SMS) message comprising the unique identifier data; and
   sending the SMS message to a phone number associated with a telephone device of the voice caller.

10. The computer-implemented method of claim 7, wherein the unique identifier data is embedded into a network address indicated by the network address indicator, and wherein receiving the indication that the unique identifier data was received from the remote device comprises receiving an indication of the access to the network location by the remote device using the network address.

11. A system for detecting potentially fraudulent voice calls to a financial services institution; the system comprising:

a computing system comprising at east one processor and a data storage device, the computing system programmed to perform operations comprising:
   receiving an indication of a voice call placed by a voice caller to an operator; wherein a network address indicator describing a network location is provided to the voice caller;
   receiving an indication of a financial services account indicated by the voice caller;
   receiving an indication of an access to the network location by a remote device;
   determining, using the indication of the access to the network location, a geographic location associated with the remote device;
   determining that the geographic location associated with the remote device matches a second geographic location associated with the financial services account; and
   responsive to the determining that the geographic location associated with the remote device matches a second geographic location associated with the financial services account, sending a match message to the operator, the match message indicating a low risk that the voice call is fraudulent.

12. The system of claim 11, wherein the match message indicates that the geographic location associated with the remote device matches the geographic location associated with the financial services account.

13. The system of claim 11, the operations further comprising:
   receiving an indication of a second voice call placed by a second voice caller to an operator, wherein a second network address indicator describing a second network location is provided to the second voice caller;
   receiving an indication of a second financial services account indicated by the voice caller;
   receiving an indication of an access to the second network location by a second remote device;
   determining, using the indication of the access to the second network location, a geographic location associated with the second remote device;
   determining that the geographic location associated with the second remote device does not match a geographic location associated with the second financial services account; and
   responsive to the determining that the geographic location associated with the second remote device does not match a geographic location associated with the second financial services account, generating an alert indicating that the second voice call is potentially fraudulent.

14. The system of claim 11, the operations further comprising generating an operator user interface (UI) comprising the network address indicator, wherein the network address indicator is provided to the voice caller by the operator via the voice call.

15. The system of claim 11, the operations further comprising:
   generating a short message service (SMS) message comprising the network address indicator; and
   sending the SMS message to a phone number associated with a telephone device of the voice caller.

16. The system of claim 15, wherein the SMS message comprises a selectable link to the network location.

17. The system of claim 11, e operations further comprising:
   generating unique identifier data;
   providing the unique identifier data to the voice caller via the voice call;

receiving an indication that the unique identifier data was received from the remote device via the access to the network location; and receiving an indication that the unique identifier data was received from the remote device via the access to the network location, the sending of the match message also being responsive to receiving the indication that the unique identifier data was received from the remote device via the access to the network location.

18. A non-transitory machine-readable medium comprising instructions thereon that, when executed by at least one processor, cause the at least one processor to execute operations comprising:

receiving an indication of a voice call placed by a voice caller to an operator; wherein a network address indicator describing a network location is provided to the voice caller;

receiving an indication of a financial services account indicated by the voice caller;

receiving an indication of an access to the network location by a remote device;

determining, using the indication of the access to the network location, a geographic location associated with the remote device;

determining that the geographic location associated with the remote device matches a second geographic location associated with the financial services account; and responsive to the determining that the geographic location associated with the remote device matches a second geographic location associated with the financial services account, sending a match message to the operator, the match message indicating a low risk that the voice call is fraudulent.

19. The non-transitory machine-readable medium of claim 18, wherein the match message indicates that the geographic location associated with the remote device matches the geographic location associated with the financial services account.

20. The non-transitory machine-readable medium of claim 18, the operations further comprising:

receiving an indication of a second voice call placed by a second voice caller to an operator, wherein a second network address indicator describing a second network location is provided to the second voice caller;

receiving an indication of a second financial services account indicated by the voice caller;

receiving an indication of an access to the second network location by a second remote device;

determining; using the indication of the access to the second network location, a geographic location associated with the second remote device;

determining that the geographic location associated with the second remote device does not match a geographic location associated with the second financial services account; and responsive to the determining that the geographic location associated with the second remote device does not match a geographic location associated with the second financial services account, generating an alert indicating that the second voice call is potentially fraudulent.

* * * * *